United States Patent
Kapinos et al.

(10) Patent No.: US 10,431,139 B2
(45) Date of Patent: Oct. 1, 2019

(54) SCREEN COLOR CALIBRATION

(71) Applicant: LENOVO (Singapore) PTE. LTD., New Tech Park (SG)

(72) Inventors: Robert James Kapinos, Durham, NC (US); Timothy Winthrop Kingsbury, Cary, NC (US); Scott Wentao Li, Cary, NC (US); Russell Speight VanBlon, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 15/659,328

(22) Filed: Jul. 25, 2017

(65) Prior Publication Data

US 2019/0035320 A1 Jan. 31, 2019

(51) Int. Cl.

| | |
|---|---|
| *G09G 3/20* | (2006.01) |
| *G09G 3/34* | (2006.01) |
| *G09G 5/02* | (2006.01) |
| *G09G 3/36* | (2006.01) |
| *G06F 1/16* | (2006.01) |
| *H04N 1/60* | (2006.01) |
| *H04N 9/64* | (2006.01) |
| *H04N 9/73* | (2006.01) |
| *H04N 17/02* | (2006.01) |
| *G06T 11/00* | (2006.01) |
| *H04N 9/69* | (2006.01) |

(52) U.S. Cl.
CPC ............ *G09G 3/2003* (2013.01); *G09G 3/20* (2013.01); *G09G 3/3413* (2013.01); *G09G 5/02* (2013.01); *G06F 1/1616* (2013.01); *G09G 3/3696* (2013.01); *G09G 2320/0646* (2013.01); *G09G 2320/0693* (2013.01); *G09G 2360/141* (2013.01); *G09G 2360/144* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,670,985 | A * | 9/1997 | Cappels, Sr. ....... | G06F 3/04897 345/207 |
| 2003/0025711 | A1* | 2/2003 | Kuo ......................... | G09G 5/02 345/600 |
| 2005/0285822 | A1* | 12/2005 | Reddy ................. | G06F 3/03542 345/76 |
| 2007/0064010 | A1* | 3/2007 | Kim ....................... | G09G 5/003 345/597 |
| 2010/0201667 | A1* | 8/2010 | Lee ......................... | H04N 17/02 345/211 |
| 2013/0076777 | A1* | 3/2013 | Park ......................... | G06F 3/14 345/594 |
| 2013/0169700 | A1* | 7/2013 | Park ......................... | G01J 3/506 345/690 |
| 2014/0071177 | A1* | 3/2014 | Chu ...................... | G09G 3/2003 345/690 |
| 2014/0340374 | A1* | 11/2014 | Ukawa ..................... | G09G 3/36 345/207 |
| 2017/0302915 | A1* | 10/2017 | Kang .................. | H04N 9/3182 |

* cited by examiner

*Primary Examiner* — Wesner Sajous
(74) *Attorney, Agent, or Firm* — Kunzler Bean & Adamson (57) ABSTRACT

For screen color calibration, a calibration screen is disposed within a computer. An optical sensor adjacent to the calibration screen measures a calibration color of the calibration screen. A screen color of the screen is calibrated using the calibration color.

17 Claims, 8 Drawing Sheets

SCREEN COLOR CALIBRATION

FIELD

The subject matter disclosed herein relates to screen color calibration.

BACKGROUND

The colors displayed by a screen may drift from true colors over time.

BRIEF SUMMARY

An apparatus for screen color calibration is disclosed. The apparatus includes a screen, a calibration screen, an optical sensor, a processor, and a memory. The calibration screen is disposed within a computer. The optical sensor is adjacent to the calibration screen and measures a calibration color of the calibration screen. The memory stores code executable by the processor to calibrate the screen color using the calibration color. A method, program product, and device also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1A:
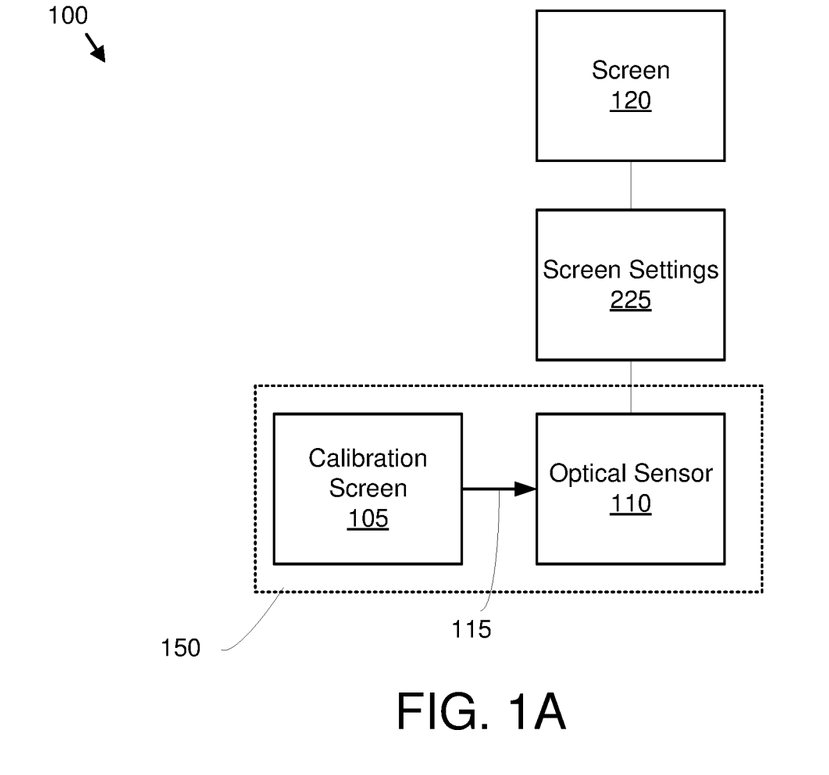
FIG. 1A is a schematic block diagram illustrating one embodiment of a calibration system.

FIG. 1A is a schematic block diagram illustrating one embodiment of a calibration system 100. In the depicted embodiment, the system 100 includes the calibration apparatus 150, a screen 120, and color settings 225. The calibration apparatus includes a calibration screen 105 and an optical sensor 110.

The calibration screen 105 may be a functional analog of the screen 120. As used herein, functional analog refers to one or more of the calibration screen 105 having a same pixel architecture as the screen 120, pixels of the calibration screen 105 degrading similarly to the pixels of the screen 120, and the calibration screen 105 mirroring brightness, contrast, hue, and other settings for the screen 120. In a certain embodiment, functional analog refers to a calibration color of the calibration screen 105 being within 5% of a screen color of the screen 120 after 24 months of operation. The calibration screen 105 may be driven by a functional equivalent signal to a signal driving the screen 120. The functional equivalent signal may be from sampled from representative pixels of the screen 120. Alternatively, the functional equivalent signal may be one of an average and a mean of signals driving the pixels of the screen 120.

The calibration screen 105 may have a minimal number of pixels. In one embodiment, the calibration screen 105 comprises m×n pixels, and at least one of m and n is less than 17. The calibration screen 105 is disposed within a computer (not shown). The optical sensor 110 is adjacent to the calibration screen 105. As used herein, adjacent refers to being within the range of 0.5 to 6 millimeters. Light 115 from the calibration screen 105 is received by the optical sensor 110.

The screen 120 may display color images. Over time, the screen color of the screen 120 may drift from displaying desired colors. The embodiments described herein calibrate the screen color for the screen 120 so the screen 120 consistently displays the desired colors over time.

The calibration apparatus 100 may calibrate the screen 120 by setting the screen settings 225 for the screen 120. In one embodiment, the optical sensor 110 measures a calibration color of the calibration screen 105. The optical sensor 110 may further calibrate the screen color of the screen 120 based on the calibration color as will be described hereafter.

Figure 1B:
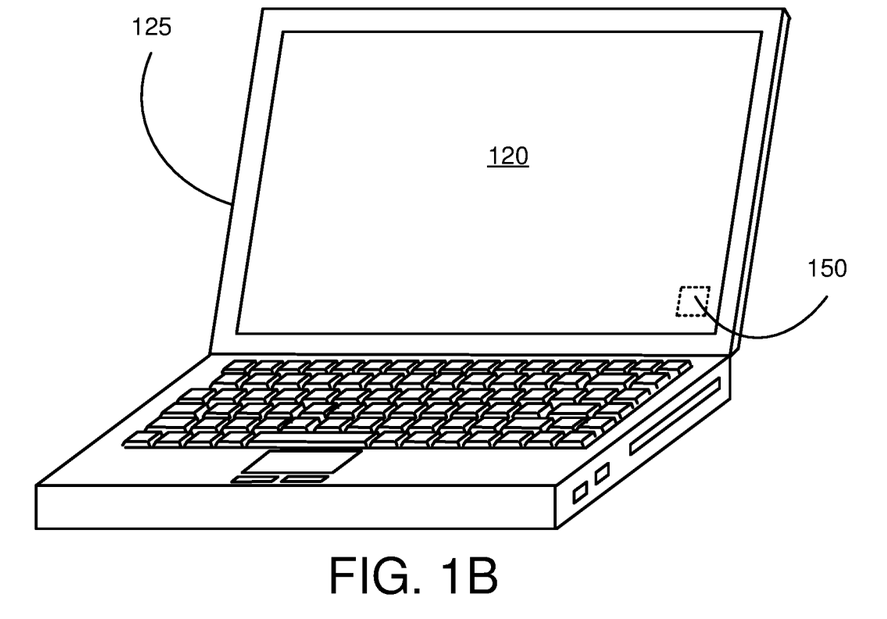
FIG. 1B is a hidden detail perspective drawing illustrating one embodiment of a calibration apparatus embedded in a computer.

FIG. 1B is a hidden detail perspective drawing illustrating one embodiment of a calibration apparatus 150 embedded in a computer 125. The computer 125 is depicted as a laptop computer. The embodiments may be practiced with other types of computers 125. In the depicted embodiment, the calibration apparatus 150 is disposed within the screen 120 of the computer 125.

Figure 1C:
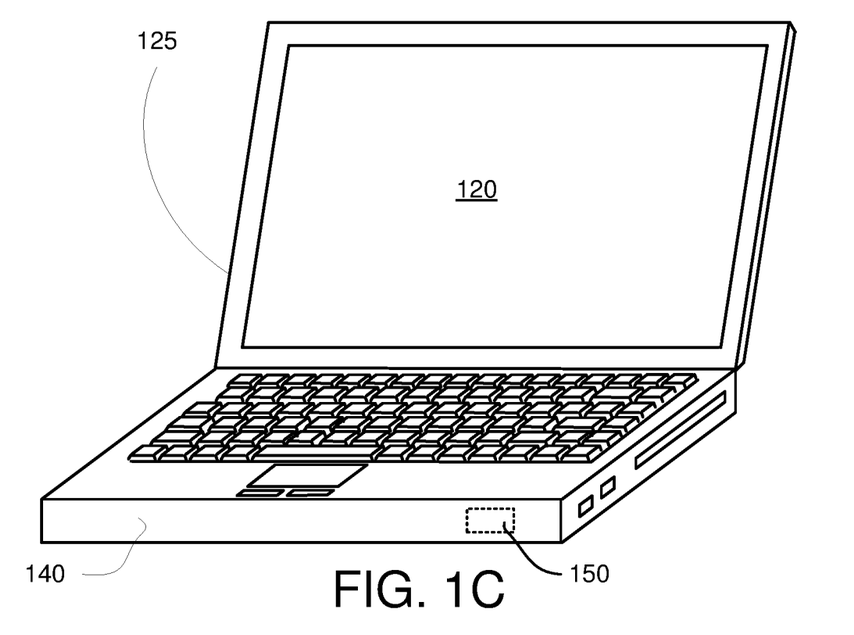
FIG. 1C is a hidden detail perspective drawing illustrating one embodiment of a calibration apparatus embedded in a computer.

FIG. 1C is a hidden detail perspective drawing illustrating one embodiment of a calibration apparatus 150 embedded in a computer 125. In the depicted embodiment, the calibration apparatus 150 is embedded in a base 140 of the computer 125.

Figure 2A:
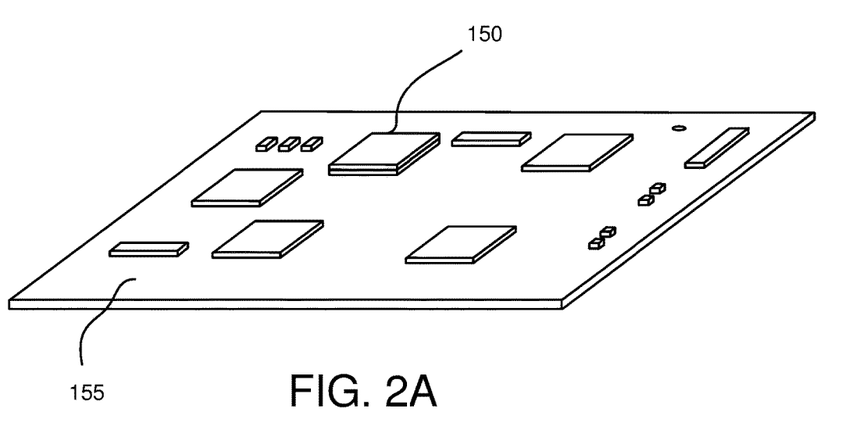
FIG. 2A is a perspective drawing illustrating one embodiment of a calibration apparatus disposed on a circuit board.

FIG. 2A is a perspective drawing illustrating one embodiment of a calibration apparatus 150 disposed on a circuit board 155. In the depicted embodiment, the calibration apparatus 150 is embodied in a single package. Alternatively, the calibration apparatus 150 may be embodied in two or more discrete packages. In one embodiment, the circuit board 155 is a motherboard for the computer 125.

Figure 2B:
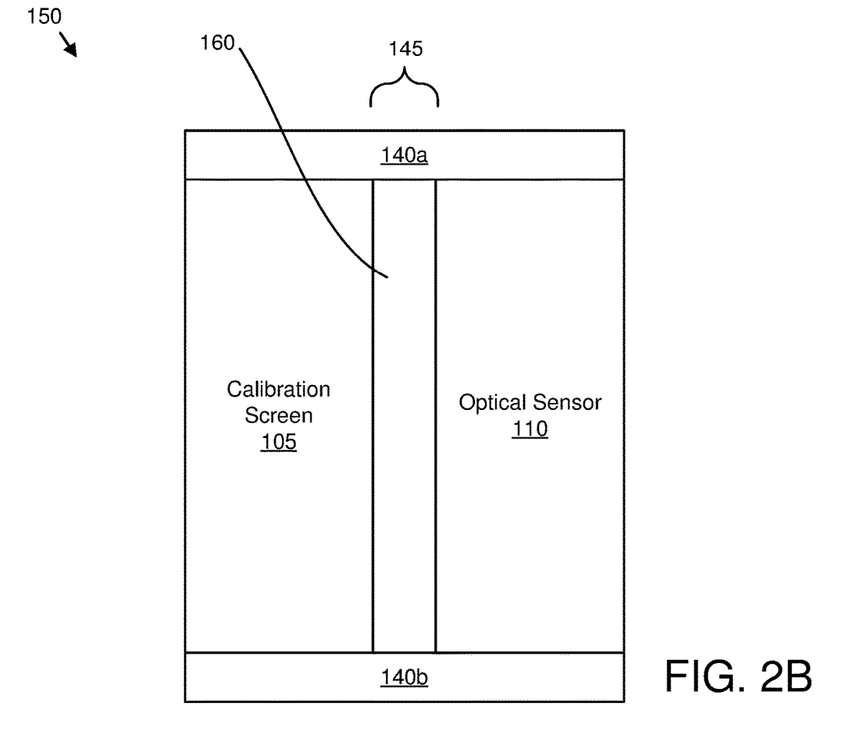
FIG. 2B is a side view drawing illustrating one embodiment of a packaged calibration apparatus.

FIG. 2B is a side view drawing illustrating one embodiment of a packaged calibration apparatus 150. In the depicted embodiment, packaging 140a-b is shown encapsulating the calibration screen 105 and the optical sensor 110. The calibration screen 105 and the optical sensor 110 may be separated by an air gap 160. The air gap 160 may have an air gap length 145 in the range of 1-2 millimeters.

Figure 3:
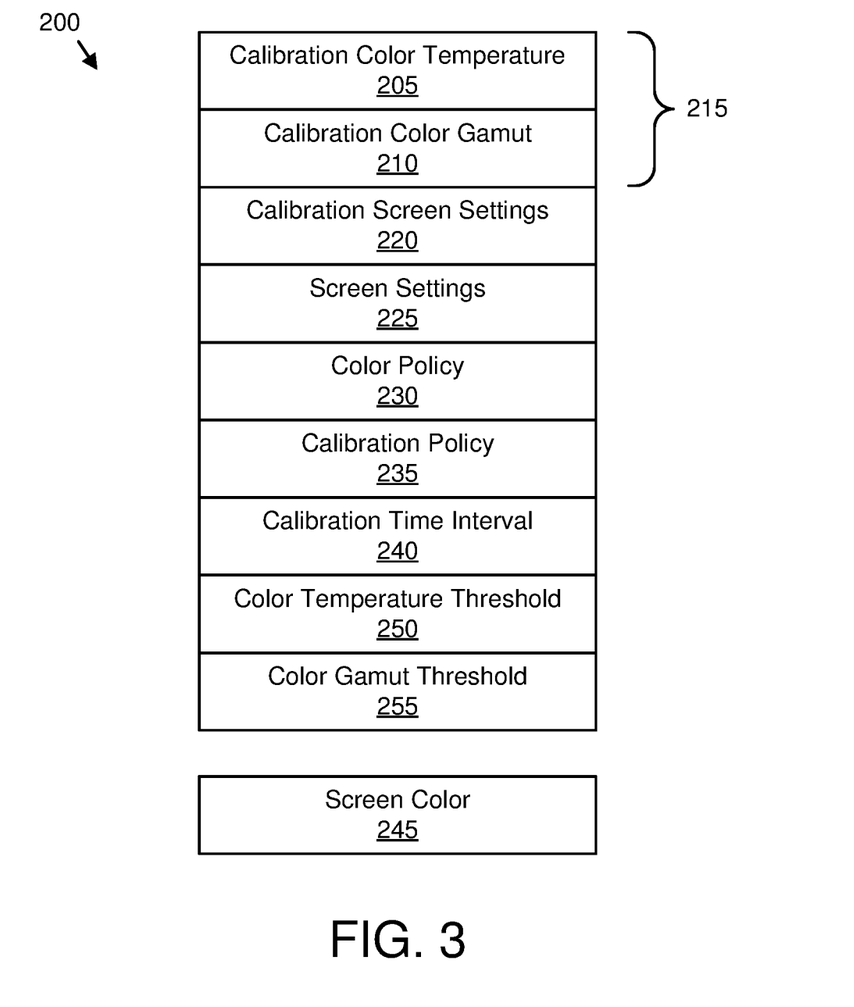
FIG. 3 is a schematic block diagram illustrating one embodiment of color data.

FIG. 3 is a schematic block diagram illustrating one embodiment of color data 200. The color data 200 may be organized as a data structure in a memory. In the depicted embodiment, the color data 200 includes a calibration color 215, calibration screen settings 220, screen settings 225, a color policy 230, a calibration policy 235, a calibration time interval 240, a color temperature threshold 250, and a color gamut threshold 255. In one embodiment, a screen color 245 is also included in the color data 200.

The calibration color 215 includes a calibration color temperature 205 and a calibration color gamut 210. Although the embodiments calibrate the screen color of the screen 120, no data for the screen color 245 of the screen 120 may be stored. Instead, the embodiments may use the calibration color 215 of the calibration screen 105 is used to set the screen settings 225 for the screen 120. In one embodiment, the calibration screen settings 220 are copied to the screen settings 225.

The calibration color temperature 205 may be based on a temperature of a blackbody radiator. The calibration color temperature 205 may be expressed in Kelvin. The calibration color gamut 210 may represent colors that can be accurately represented by the calibration screen 105.

The calibration screen settings 220 may adjust the calibration color 215 of the calibration screen 105. The calibration screen settings 220 may determine the calibration color temperature 205. In addition, the calibration screen settings 220 may determine the calibration color gamut 210.

The screen settings 225 may adjust the screen color 245 exhibited by the screen 120. The screen color 245 may exhibit a screen color temperature and a screen color gamut. However, the screen color 245, the screen color temperature, and the screen color gamut are not measured by the calibration apparatus 150.

The color policy 230 may specify a desired calibration color 215. The calibration apparatus 150 may determine whether the calibration color 215 measured for the calibration screen 105 satisfies the color policy 230. The color policy 230 may be satisfied if the calibration color temperature 205 is within the color temperature threshold 250 and/or if the calibration color gamut 210 is within the color gamut threshold 255.

The color temperature threshold 250 may specify a maximum allowable deviation from the color policy 230. In one embodiment, the color temperature threshold 250 is in the range of 1 to 5 percent of the color policy 230. The color gamut threshold 255 may specify a maximum allowable deviation from the color policy 230. In a certain embodiment, the color gamut threshold 255 is in the range of 3 to 15 percent of the color policy 230.

The calibration policy 235 may determine whether to calibrate the screen 120. The calibration policy 235 may be satisfied by one or more of an expiration of the calibration time interval 240 and a boot of the computer 125. The calibration time interval 240 may specify a minimum time interval between calibrations of the screen 120.

Figure 4:
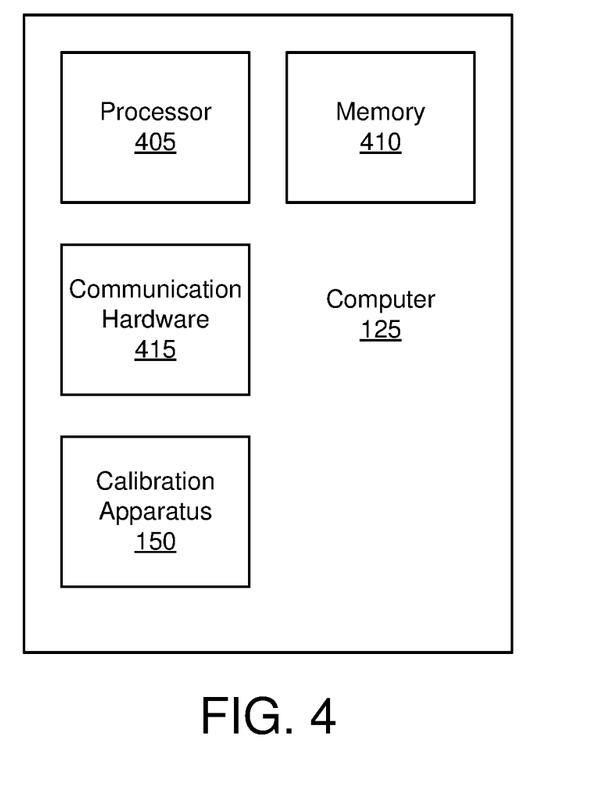
FIG. 4 is a schematic block diagram illustrating one embodiment of a computer.

FIG. 4 is a schematic block diagram illustrating one embodiment of the computer 125. In the depicted embodiment, the computer 125 includes a processor 405, a memory 410, and communication hardware 415. The computer 125 may also include the calibration apparatus 150. The memory 410 may include a semiconductor storage device, hard disk drive, an optical storage device, a micromechanical storage device, or combinations thereof. The memory 410 may store code. The processor 405 may execute the code. The communication hardware 415 may communicate with other devices such as the calibration apparatus 150.

In one embodiment, the calibration apparatus 150 directly calibrates the screen color 245 of the screen 120 based on the calibration color 215. For example, the optical sensor 110 may include semiconductor hardware for setting the calibration screen settings 220 to satisfy the color policy 230 and to set the screen settings 225 to calibrate the screen 120.

Alternatively, the optical sensor 110 may communicate the calibration color 215 of the calibration screen 105 to the processor 405 and the processor 405 may calibrate the screen color of the screen 120 using the calibration color 215.

Figure 5A:
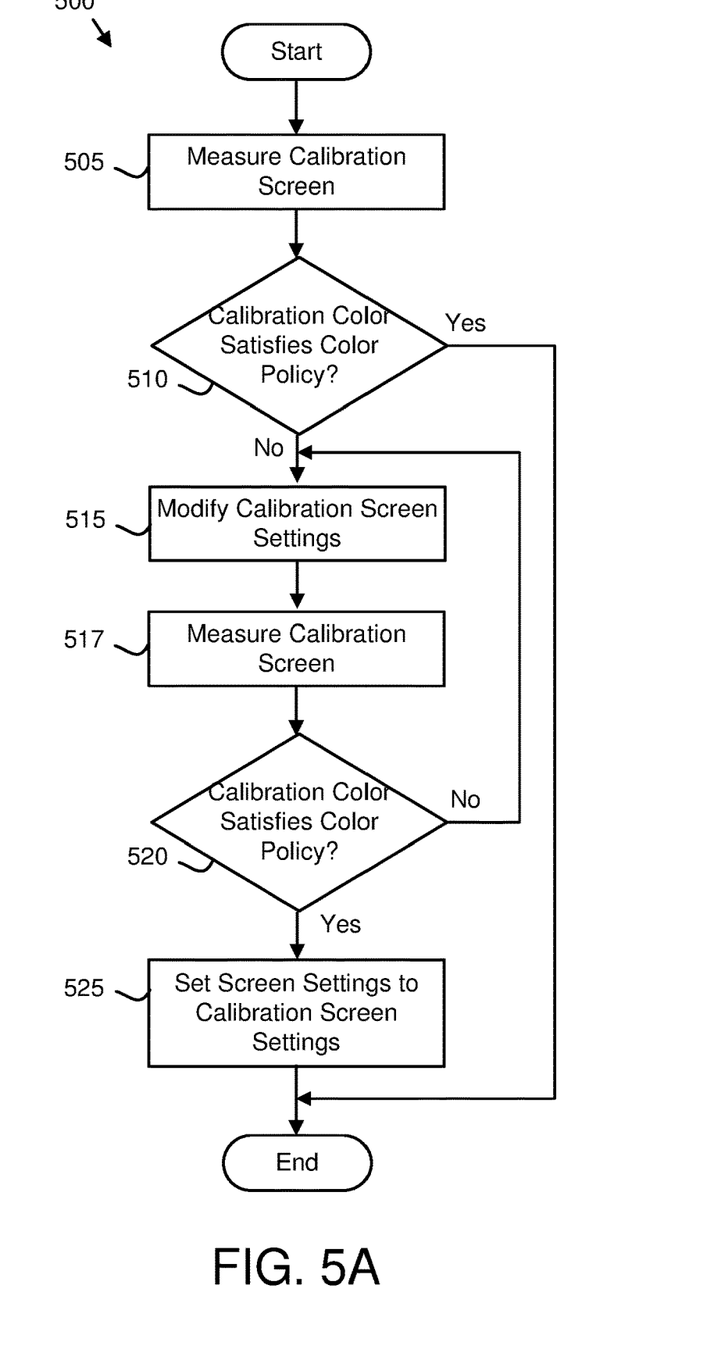
FIG. 5A is a schematic flow chart diagram illustrating one embodiment of a color calibration method.

FIG. 5A is a schematic flow chart diagram illustrating one embodiment of a color calibration method 500. The method 500 may calibrate the screen color 245 of the screen 120 based on the calibration color 215. The method 500 may be performed by the calibration apparatus 150 and/or the processor 405.

The method 500 starts, and in one embodiment, the optical sensor 110 measures 505 the calibration color 215 of the calibration screen 105. The optical sensor 110 may measure 505 the calibration color temperature 205 and the calibration color gamut 210 and store the calibration color temperature 205 and the calibration color gamut 210 to the color data 200.

The calibration apparatus 150 and/or processor 405 may determine 510 if the calibration color 215 satisfies the color policy 230. In one embodiment, the calibration color 215 satisfies the color policy 230 if the calibration color temperature 205 is within the color temperature threshold 250 of the color policy 230. In addition, the calibration color 215 may satisfy the color policy 230 if the calibration color gamut 210 is within the color gamut threshold 255 of the color policy 230.

If the calibration color 215 satisfies the color policy 230, the method 500 ends. If the calibration color 215 does not satisfy the color policy 230, the calibration apparatus 150 and/or processor 405 may modify 515 the calibration screen settings 220. The calibration screen settings 220 may be modified 515 based on an algorithm in order to satisfy the color policy 230.

The optical sensor 105 may measure 517 the calibration color 215 of the calibration screen 105 and the calibration apparatus 150 and/or processor 405 may further determine 520 if the calibration color 215 satisfies the color policy 230. If the calibration color 215 does not satisfy the color policy 230, the calibration apparatus 150 and/or processor 405 may further modify 515 the calibration screen settings 220. If the calibration color 215 satisfies the color policy 230, the calibration apparatus 150 and/or processor 405 may set 525 the screen settings 225 for the screen 120 to the calibration screen settings 220 and the method 500 ends. As a result, the screen settings 225 for the screen 120 are equivalent to the calibration screen settings 220 for the calibration screen 105. Thus, the screen 120 is calibrated based on the calibration color 215 without the optical sensor 110 measuring the screen color of the screen 120. Therefore, the calibration apparatus 150 may be completely embedded within the computer 125 and/or the screen 120. In addition, the optical sensor 110 does not require a view of the screen 120 in order to calibrate the screen 120.

Figure 5B:
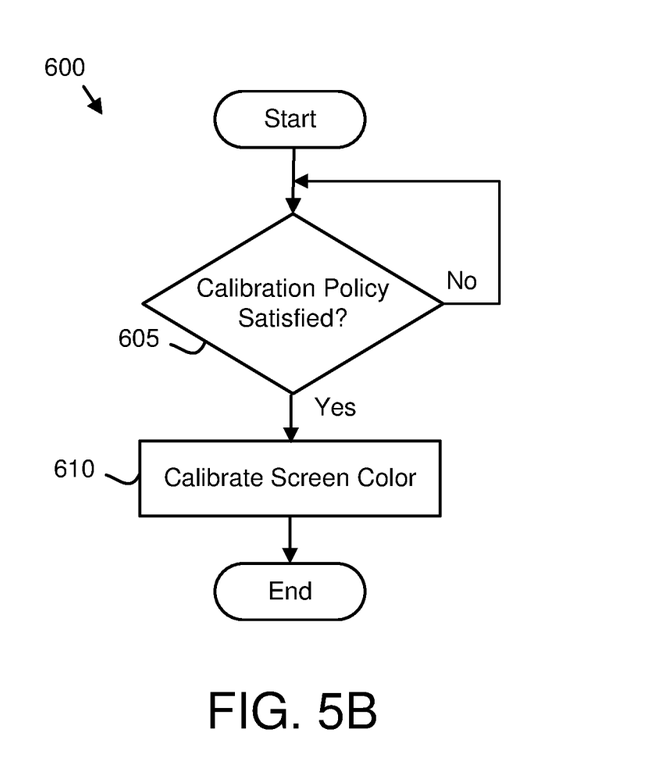
FIG. 5B is a schematic flow chart diagram illustrating one embodiment of a color calibration initiation method.

FIG. 5B is a schematic flow chart diagram illustrating one embodiment of a color calibration initiation method 600. The method 600 may determine whether to calibrate the screen 120 as described in FIG. 5A. The method 600 may be performed by the calibration apparatus 150 and/or the processor 405.

The method 600 starts, and in one embodiment, the calibration apparatus 150 and/or the processor 405 determine 605 whether the calibration policy 235 is satisfied. The calibration policy 235 may be satisfied by the expiration of the calibration time interval 240. In addition, the calibration policy 235 may be satisfied by a boot of the computer 125. If the calibration policy 235 is not satisfied, the calibration apparatus 150 and/or processor 405 may continue to determine 605 whether the calibration policy 235 is satisfied.

If the calibration policy 235 is satisfied, the calibration apparatus 150 and/or processor 405 may calibrate 610 the screen color of the screen 120 and the method 600 ends. The screen color may be calibrated 610 as described in FIG. 5A.

Figure 5C:
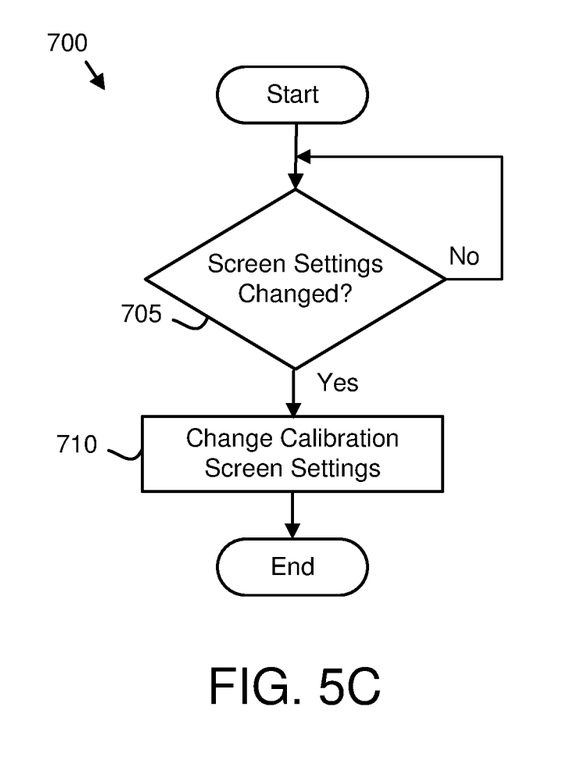
FIG. 5C is a schematic flow chart diagram illustrating one embodiment of the screen matching method.

FIG. 5C is a schematic flow chart diagram illustrating one embodiment of a screen matching method 700. The method 700 may match selected calibration screen settings 220 for the calibration screen 105 such as whether the calibration screen 105 is active and/or the brightness to the screen settings 225 for the screen 120. The method 700 may be performed by the calibration apparatus 150 and/or the processor 405.

The method 700 starts, and in one embodiment, the calibration apparatus 150 and/or processor 405 determine 705 if the screen settings 225 for the screen 120 have been changed. In a certain embodiment, the calibration apparatus 150 and/or processor 405 determine 705 if one or more selected screen settings 225 have manually and/or programmatically changed. The selected screen settings 225 may include brightness, contrast, color balance, and the like.

If the screen settings 225 have not been changed, the calibration apparatus 150 and/or processor 405 continues to determine 705 if the screen settings 225 been changed. If the screen settings 225 or the selected screen settings 225 have been changed, the calibration apparatus 150 and/or processor 405 changes 710 corresponding calibration screen settings 220 to match the change selected screen settings 225 and the method 700 ends. As a result, the operation of the calibration screen 105 continually closely matches the operation of the screen 120. Thus, the calibration color 215 of the calibration screen 105 will degrade similarly to the screen color of the screen 120.

The embodiments measure the calibration color 215 of the calibration screen 105 and calibrate the screen color of the screen 120 based on the calibration color 215. The embodiments may modify the calibration screen settings 220 for the calibration screen 105 to satisfy the color policy 230. The embodiments may further set the screen settings 225 for the screen 120 to the calibration screen settings 220. As a result, the screen color of the screen 120 may be calibrated without the optical sensor 110 viewing the screen 120. In addition, the optical sensor 110 and calibration apparatus 150 may be discreetly embodied within the computer 125.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a screen;
   a calibration screen disposed within a computer;
   an optical sensor adjacent to the calibration screen that measures a calibration color of the calibration screen, wherein the calibration screen is separate from the screen and has a color calibration within 5 percent of a screen color of the screen after 24 months;
   a processor;
   a memory that stores code executable by the processor to calibrate the screen color using the calibration color by:
   determining whether the calibration color satisfies a color policy;
   in response to the calibration color not satisfying the color policy, modifying calibration screen settings for the calibration screen; and
   setting screen settings for the screen to the calibration screen settings.

2. The apparatus of claim 1, wherein the calibration screen is a functional analog of the screen.

3. The apparatus of claim 1, wherein in the calibration screen comprises m×n pixels, and at least one of m and n is less than 17.

4. The apparatus of claim 1, wherein the optical sensor and the calibration screen are packaged together.

5. The apparatus of claim 1, wherein the optical sensor and the calibration sensor are mounted on a circuit board.

6. The apparatus of claim 1, wherein the calibration color comprises a calibration color temperature and a calibration color gamut.

7. The apparatus of claim 1, wherein the screen color is calibrated in response to the calibration policy being satisfied, the calibration policy being satisfied by one or more of an expiration of a calibration time interval and a boot of the computer.

8. A method comprising:
   measuring, by use of an optical sensor, a calibration color of a calibration screen disposed within a computer, wherein the calibration screen is separate from a screen and has a color calibration within 5 percent of a screen color of the screen after 24 months; and
   calibrating, by use of semiconductor hardware, a screen color of the screen based on the calibration color by:
   determining whether the calibration color satisfies a color policy;
   in response to the calibration color not satisfying the color policy, modifying calibration screen settings for the calibration screen; and
   setting screen settings for the screen to the calibration screen settings.

9. The method of claim 8, wherein one or more of the calibration screen is a functional analog of the screen and the calibration screen is driven by a functional equivalent signal to a signal driving the screen.

10. The method of claim 8, wherein in the calibration screen comprises m×n pixels, and at least one of m and n is less than 17.

11. The method of claim 8, wherein the optical sensor and the calibration screen are packaged together.

12. The method of claim 8, wherein the optical sensor and the calibration sensor are mounted on a circuit board.

13. The method of claim 8, wherein the calibration color comprises a calibration color temperature and a calibration color gamut.

14. The method of claim 8, wherein the screen color is calibrated in response to the calibration policy being satisfied, the calibration policy being satisfied by one or more of an expiration of a calibration time interval and a boot of the computer.

15. A program product comprising a non-transitory computer readable storage medium that stores code executable by a processor, the executable code comprising code to:
   measure a calibration color of a calibration screen disposed within a computer using an optical sensor, wherein the calibration screen is separate from a screen and has a color calibration within 5 percent of a screen color of the screen after 24 months;
   calibrate a screen color of the screen based on the calibration color by:
   determining whether the calibration color satisfies a color policy;
   in response to the calibration color not satisfying the color policy, modifying calibration screen settings for the calibration screen; and
   setting screen settings for the screen to the calibration screen settings.

16. The program product of claim 15, wherein the calibration screen is a functional analog of the screen.

17. An apparatus comprising:
   a calibration screen disposed within a computer;
   an optical sensor adjacent to the calibration screen that measures a calibration color of the calibration screen, wherein the calibration screen is separate from a screen and has a color calibration within 5 percent of a screen color of the screen after 24 months and calibrates a screen color of the screen based on the calibration color by:
   determining whether the calibration color satisfies a color policy;
   in response to the calibration color not satisfying the color policy, modifying calibration screen settings for the calibration screen; and
   setting screen settings for the screen to the calibration screen settings.

* * * * *